(12) United States Patent
Aigner

(10) Patent No.: US 6,849,828 B2
(45) Date of Patent: Feb. 1, 2005

(54) METHOD FOR REGULATING AND/OR CONTROLLING A WELDING CURRENT SOURCE WITH A RESONANCE CIRCUIT

(75) Inventor: Hubert Aigner, Taufkirchen/Trattnach (AT)

(73) Assignee: Fronius International GmbH, Pettenbach (AT)

( * ) Notice: Subject to any disclaimer, the term of this patent is extended or adjusted under 35 U.S.C. 154(b) by 149 days.

(21) Appl. No.: 10/181,172

(22) PCT Filed: Jan. 19, 2001

(86) PCT No.: PCT/AT01/00014

§ 371 (c)(1),
(2), (4) Date: Oct. 24, 2002

(87) PCT Pub. No.: WO01/53030

PCT Pub. Date: Jul. 26, 2001

(65) Prior Publication Data

US 2003/0132211 A1 Jul. 17, 2003

(30) Foreign Application Priority Data

Jan. 20, 2000 (AT) .......................................... A 88/2000

(51) Int. Cl.[7] ................................................. B23K 9/10
(52) U.S. Cl. ............................. 219/137 PS; 219/130.21
(58) Field of Search .......................... 219/130.1, 130.31, 219/130.32, 130.33, 137 PS; 363/17, 28, 71, 79, 97

(56) References Cited

U.S. PATENT DOCUMENTS 4,769,754 A * 9/1988 Reynolds et al. ............. 363/71
5,712,771 A * 1/1998 Fitter et al. .................... 363/17
5,783,799 A * 7/1998 Geissler ................ 219/137 PS

FOREIGN PATENT DOCUMENTS

| DE | 44 11 227 | 10/1995 |
|---|---|---|
| EP | 0 602 495 | 6/1994 |
| JP | 10-277739 A | * 10/1998 |
| WO | WO97/01211 | 1/1997 |

OTHER PUBLICATIONS

L. Malesani et al.(Oct. 3, 1993) "Electronic Welder with High–Frequency Resonant Inverter", IAS'93 Conference Record of the IEEE Industry Applications Conference, 28th IAS Annual Meeting, pp. 1073–1080, XP000419573.

* cited by examiner

Primary Examiner—Clifford C. Shaw
(74) Attorney, Agent, or Firm—Collard & Roe, P.C.

(57) ABSTRACT

The invention describes a method of controlling a welding current source (2) having a resonant circuit (27), whereby a bridge circuit (28) is controlled by a control system (4). A consumer, in particular a welding process, is supplied with energy via the bridge circuit (28) from a power source (29). In order to control the individual switching elements (32–35) of the bridge circuit (28), fixed pre-set control states S1 to S6 are stored and, during normal operation, the bridge circuit (28) is controlled on the basis of the control states S1 to S4 one after the other. If a change in resistance occurs at the consumer, the control system (4) switches to a special operating mode at the resonance frequency of the resonant circuit (27) and the bridge circuit (28) is controlled on the basis of the stored control states in order to run the special operating mode.

17 Claims, 10 Drawing Sheets

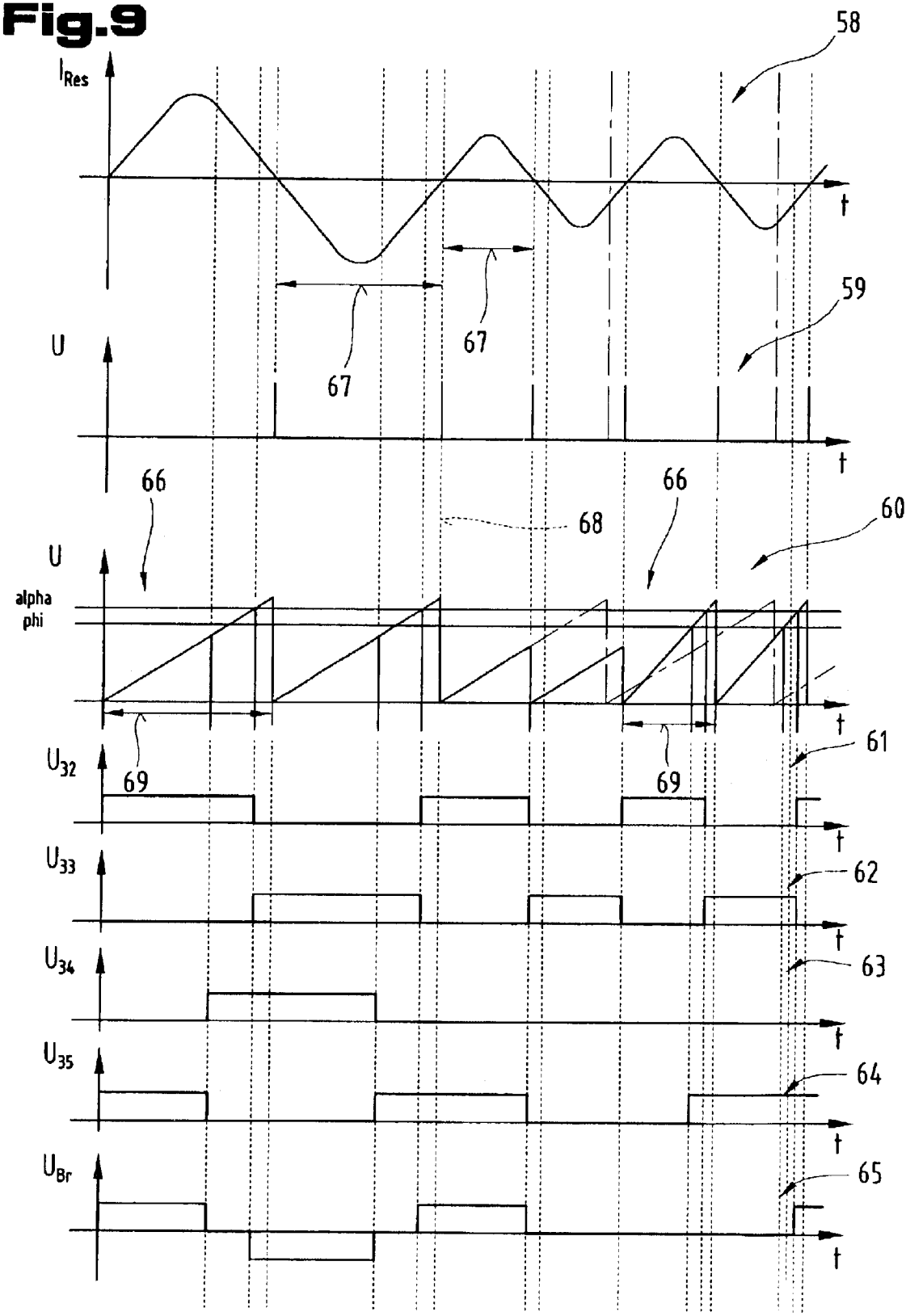

METHOD FOR REGULATING AND/OR CONTROLLING A WELDING CURRENT SOURCE WITH A RESONANCE CIRCUIT

CROSS REFERENCE TO RELATED APPLICATIONS

Applicant claim priority under 35 U.S.C. §119 of Austrian Application No. A 88/2000 filed Jan. 20, 2000. Applicant also claims priority under 35 U.S.C. 365 of PCT/AT01/00014 filed Jan. 19, 2001. The international application under PCT article 21(2) was not published in English.

The invention relates to a method of regulating and/or controlling a welding current source with a resonant circuit, of the type described in claims 1 and 25.

An arc welding apparatus with a resonant circuit is already known from patent document DE 44 11 227 A1. It consists of a phase-inverting source with a rectifier, supplied by a mains voltage, an intermediate circuit, a rectifier co-operating with a clocked, primary-side current transformer and a secondary-side current transformer, with which a welding process, in particular a welding torch, is connected. The current transformer is clocked via a bridge circuit, in particular a half-bridge, the bridge circuit being made up switching elements. The switching elements of the half-bridge are electrically conductive during a pre-set switching period. The switching elements of the bridge circuit are controlled and/or regulated so that the switching elements are switched whenever either the resonant current or the resonant voltage drops to zero and, to deactivate the switching elements, either the resonant current or the resonant voltage is damped to zero, and this value is maintained for a brief period before deactivating and shutting down the switching elements.

The disadvantage of this approach is that a resonant circuit of this type operates on a quasi or semi-resonant basis only, i.e. current is able to flow at the inductance in one direction only and voltage can be applied to the capacitor in one polarity only.

The underlying objective of the invention is to propose a method of regulating and/or controlling a welding current source with a resonant circuit, whereby the welding current source is controlled and/or regulated depending on the output conditions of the consumer.

In a method of controlling a welding current source having a resonant circuit in the form of a serial/parallel converter, in which a bridge circuit comprising individual switching elements is controlled by a control system and a welding process is supplied with voltage and current pulse from a power source via the bridge circuit, the control system controle the bridge circuit is switched by the control states store in the control system so that the bias point on a characteristic curve of the resonant circuit lies outside a resonance frequency and, whenever a change in resistance occurs in the welding process, the control system operates with the bridge circuit in a special operating mode, in which the bridge circuit is operated at the natural frequency of the resonant circuit on the basic of the control states and sequences stored for the special operating mode, this objective is achieved by the invention as a result of the following features:

the control states fixed for normal operation of the bridge circuit provided as a full bridge are a positive drive phase, a positive freewheeling phase, a negative drive phase, and a negative freewheeling phase and in the special operating mode, the bridge circuit is switched from a drive phase, preferably consecutively, into one of several alternative control states in which the switching elements of the other bridge branch remain activated, and the control system monitors how often a switch is made from one special mode to the other special mode.

The advantage of this approach is that controlling the welding current source in this way in particular the bridge circuit, ensures that the bias point is always maintained on the same side of the resonance curve, in particular on the rising or falling edge of the resonance curve. Another advantage resides in the fact that, because of the different operating modes, in particular normal mode, special operating mode and/or the special control method, the resonant circuit continues to respond independently of an external power supply, thereby enabling the switching frequency of the switching elements to be tuned and readjusted to the resonance frequency of the resonant circuit. Another significant advantage is the fact that by using a method of this type to regulate a welding current source with a resonant circuit, a corresponding output curve can be obtained at which, with a low flow of current, a corresponding high output voltage is available for maintaining the arc, or igniting the arc, whilst allowing the power component and the welding current source to be kept to compact dimensions since the additional energy needed is made available by the resonant circuit.

The advantage of this approach is that controlling the welding current source in this way in particular the bridge circuit, ensures that the bias point is always maintained on the same side of the resonance curve, in particular on the rising or falling edge of the resonance curve. Another advantage resides in the fact that, because of the different operating modes, in particular normal mode, special operating mode and/or the special control method, the resonant circuit continues to respond independently of an external power supply, thereby enabling the switching frequency of the switching elements to be tuned and readjusted to the resonance frequency of the resonant circuit. Another significant advantage is the fact that by using a method of this type to regulate a welding current source with a resonant circuit, a corresponding output curve can be obtained at which, with a low flow of current, a corresponding high output voltage is available for maintaining the arc, or igniting the arc, whilst allowing the power component and the welding current source to be kept to compact dimensions since the additional energy needed is made available by the resonant circuit.

It is of advantage to store a sequence of control states of the switching elements in the control system because a standard control sequence can be set up for normal operation. Consequently a reproduction pulsed operation can be maintained at the consumer under constant conditions and hence a good welding result obtained.

Following a change in the resistance of the welding process; the pre scheduled normal state, tuned to the resonant circuit, can be restored if the control states are activated during a constant state in the conditions at the welding process on the basis of a time difference between two immediately consecutive current zeros of a status variable of the resonant circuit.

The objective may also be achieved by the invention as a result of the features defined in the claims. The advantage of a welding current source of this type is that, because of the layout of the resonant circuit and the fact that the different control states of the switching elements and their switching duration are based on the resonance frequency and a status variable in the resonant circuit and its zero crossing is changed, requiring few pre-defined control sequences which can be selected during different operating states from the consumer, not only is the system able to meet requirements with very little in the way of additional hardware, a control can also be applied at high speed, which places less stress on the high-power switching elements used, thereby ensuring a longer service life. Another advantage to be had from the layout of the resonant circuit is that components with a considerably lower rating can be used to supply the consumer with significantly higher voltages, which means that use can advantageously be made of the time when a short circuit is being resolved, for example transferring a drop of melt from the electrode to the workpiece.

The invention will be described in more detail with reference to embodiments illustrated in the drawings.

Of these:

FIG. 9 is a simplified schematic illustration, showing a sequence diagram for controlling the welding current source in the event of an increase in resonance frequency—as illustrated in FIG. 8;

Firstly, it should be pointed out that the same parts described in the different embodiments are denoted by the same reference numbers and the positions chosen for the purposes of the description can be transposed in terms of meaning to a new position when another position is being described.

Figure 1:
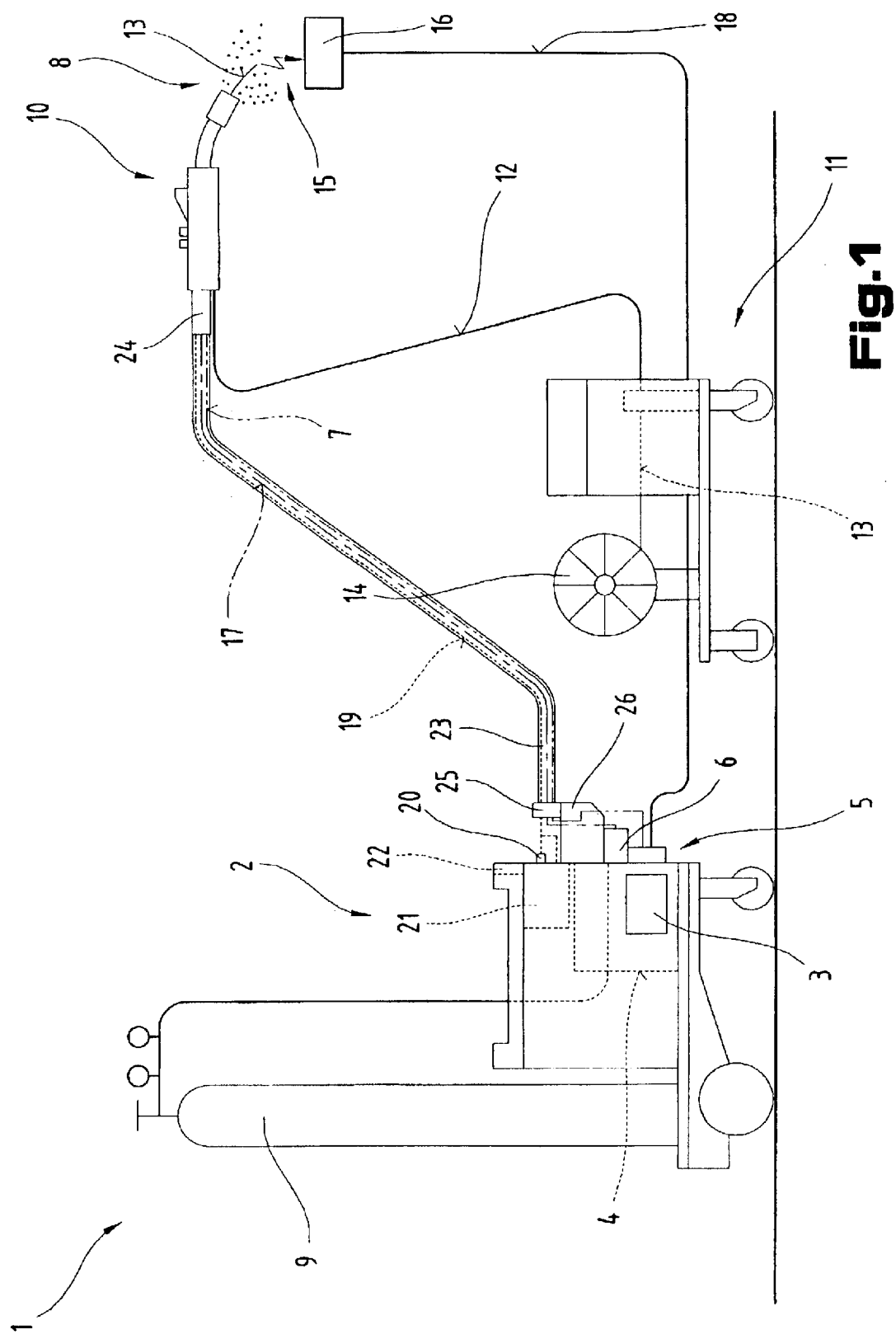
FIG. 1 is a schematic diagram of a welding machine and a welding apparatus.

FIG. 1 illustrates a welding system and a welding apparatus 1 for a whole range of welding processes, e.g. MIG-MAG welding and TIG welding or electrode welding processes. Clearly, the solution proposed by the invention may be used with a current source and a welding current source.

The welding apparatus 1 has a welding current source 2 with a power component 3, a control system 4 and a switching element 5 co-operating with the power component 3 and control system 4. The switching element 5 and the control system 4 are connected to a control valve 6 incorporated in a supply line 7 for a gas 8, in particular an inert gas such as $CO_2$, helium or argon and such like, running between a gas storage 9 and a welding torch 10.

Furthermore, a wire feed device 11 such as commonly used for MIG-MAG welding may also be activated via the control system 4 in order to feed a welding wire 13 from a supply reel 14 through a supply line 12 into the region of the welding torch 10. Clearly, the wire feed device 11 could also be integrated in the welding device 1, in particular in the basic housing, in a manner known from the prior art, rather than used as an add-on device as illustrated in FIG. 1.

The current needed to strike an arc 15 between the welding wire 13 and a workpiece 16 is fed via a supply line 17 from the power component 3 of the current source 2 to the welding torch 10 and the welding wire 13, the workpiece 16 to be welded also being connected to the welding apparatus 1, in particular to the current source 2, via another supply line 18 so that a current circuit can be established across the arc 15.

In order to cool the welding torch 10, the welding torch 10 can be connected via a cooling circuit 19, with an integrated flow indicator 20, to a fluid container, in particular a water container 21, so that the cooling circuit 19, in particular a fluid pump used to pump the liquid contained in the water container 21, can be activated when the welding torch 10 is switched on, thereby enabling the welding torch 10 and the welding wire 13 to be cooled.

The welding apparatus 1 also has an input and/or output device 22, by means of which a whole range of settings can be entered for welding parameters and operating modes of the welding apparatus 1. The welding parameters entered at the input and/or output device 22 are then forwarded to the control system 4, from where they are applied to the individual components of the welding system and the welding apparatus 1.

In the embodiment illustrated as an example here, the welding torch 10 is also connected to the welding apparatus 1 and the welding system by means of a hose pack 23. The individual lines from the welding apparatus 1 to the welding torch 10 are disposed in the hose pack 23. The hose pack 23 is connected by means of a connector device 24, known from the prior art, to the welding torch 10, whilst the individual lines in the hose pack 23 are connected to the individual contacts of the welding apparatus 1 by means of connecting sockets and plug connectors. To relieve tension on the hose pack 23, the hose pack 23 is connected via a tension-relieving device 25 to a housing 26, in particular the basic housing of the welding apparatus 1.

Figure 2:
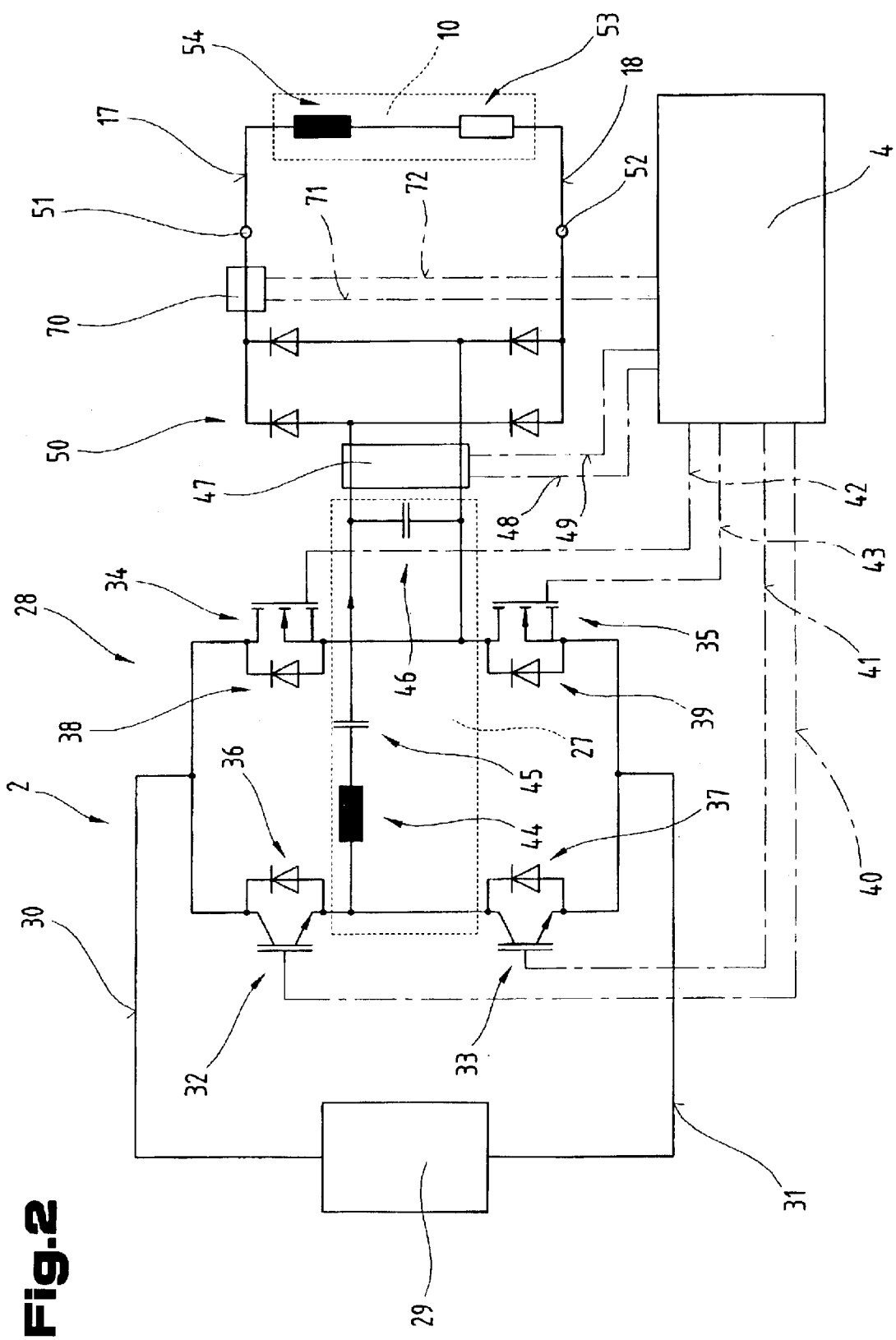
FIG. 2 is simplified, schematic illustration, showing a circuit diagram of a welding current source with a resonant circuit.
Figure 3:
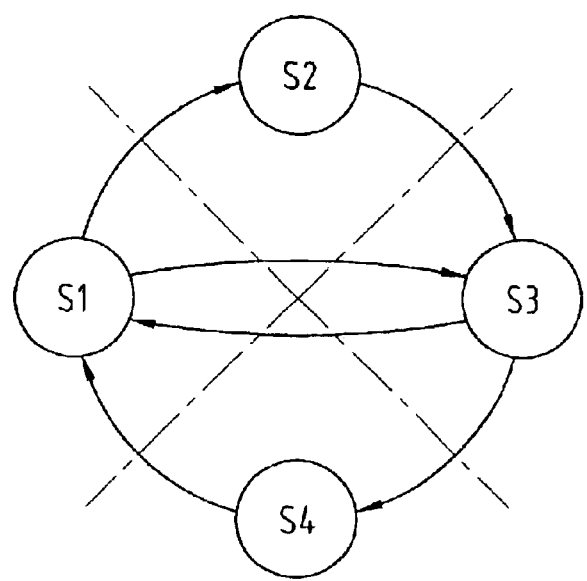
FIG. 3 is a simplified schematic illustration, showing a sequence diagram for the welding current source.
Figure 4:
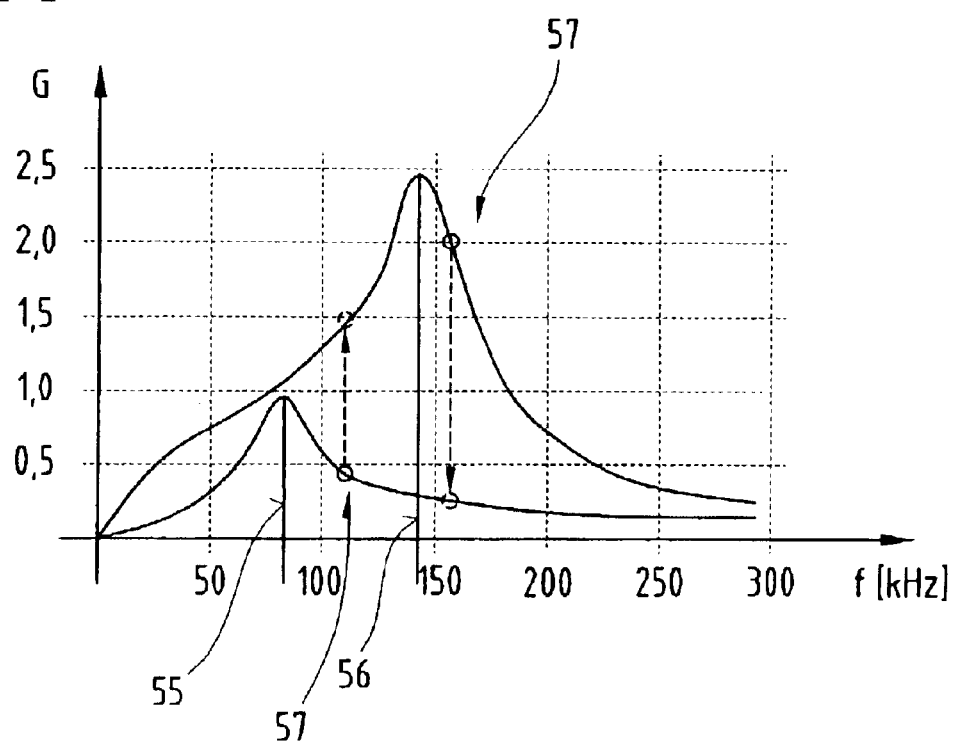
FIG. 4 is a simplified schematic illustration, showing a diagram of the resonance curve of the welding current source.
Figure 5:
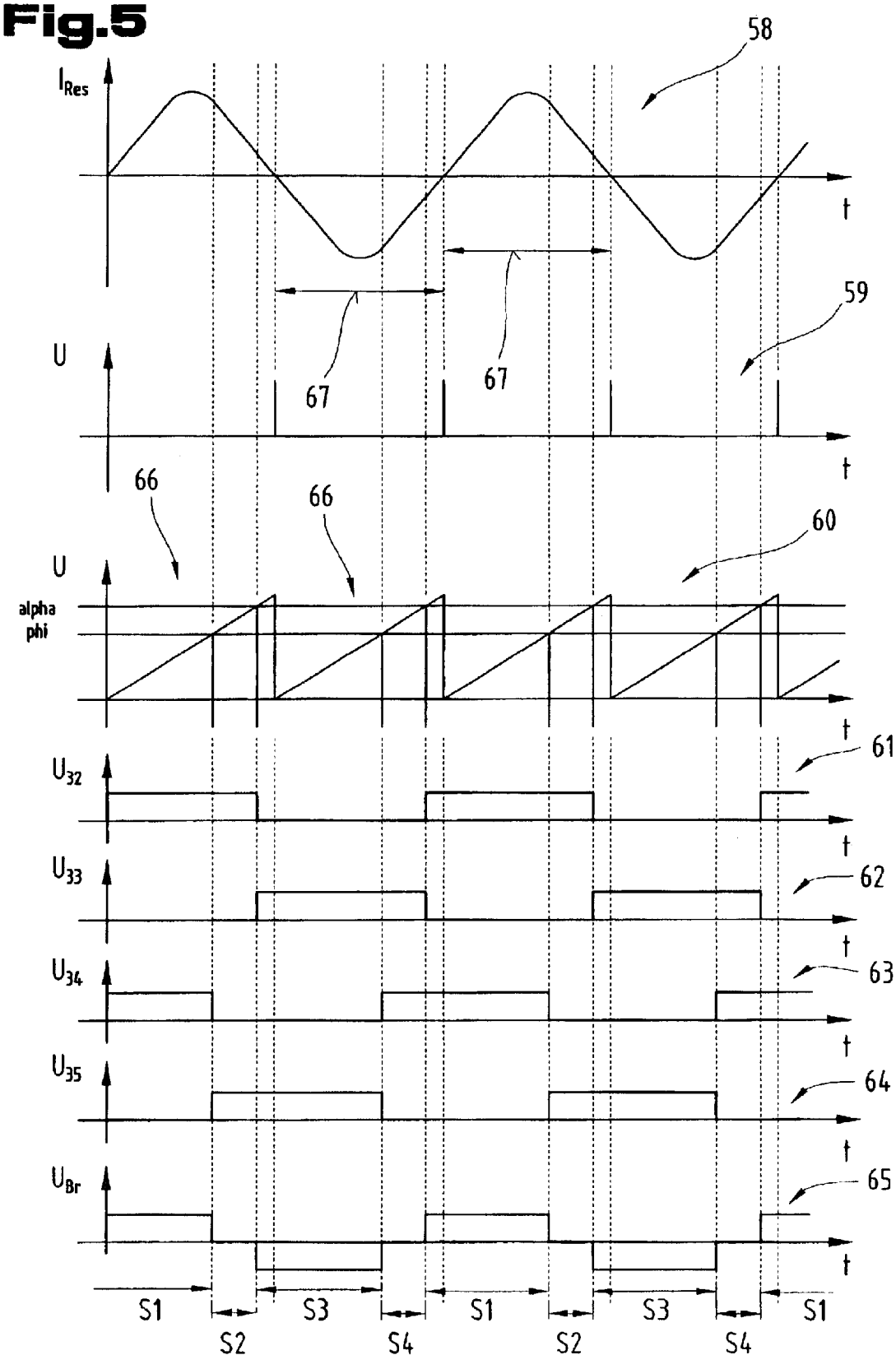
FIG. 5 is a simplified schematic illustration, showing a sequence diagram for controlling the welding current source when the resonance frequency is constant.
Figure 6:
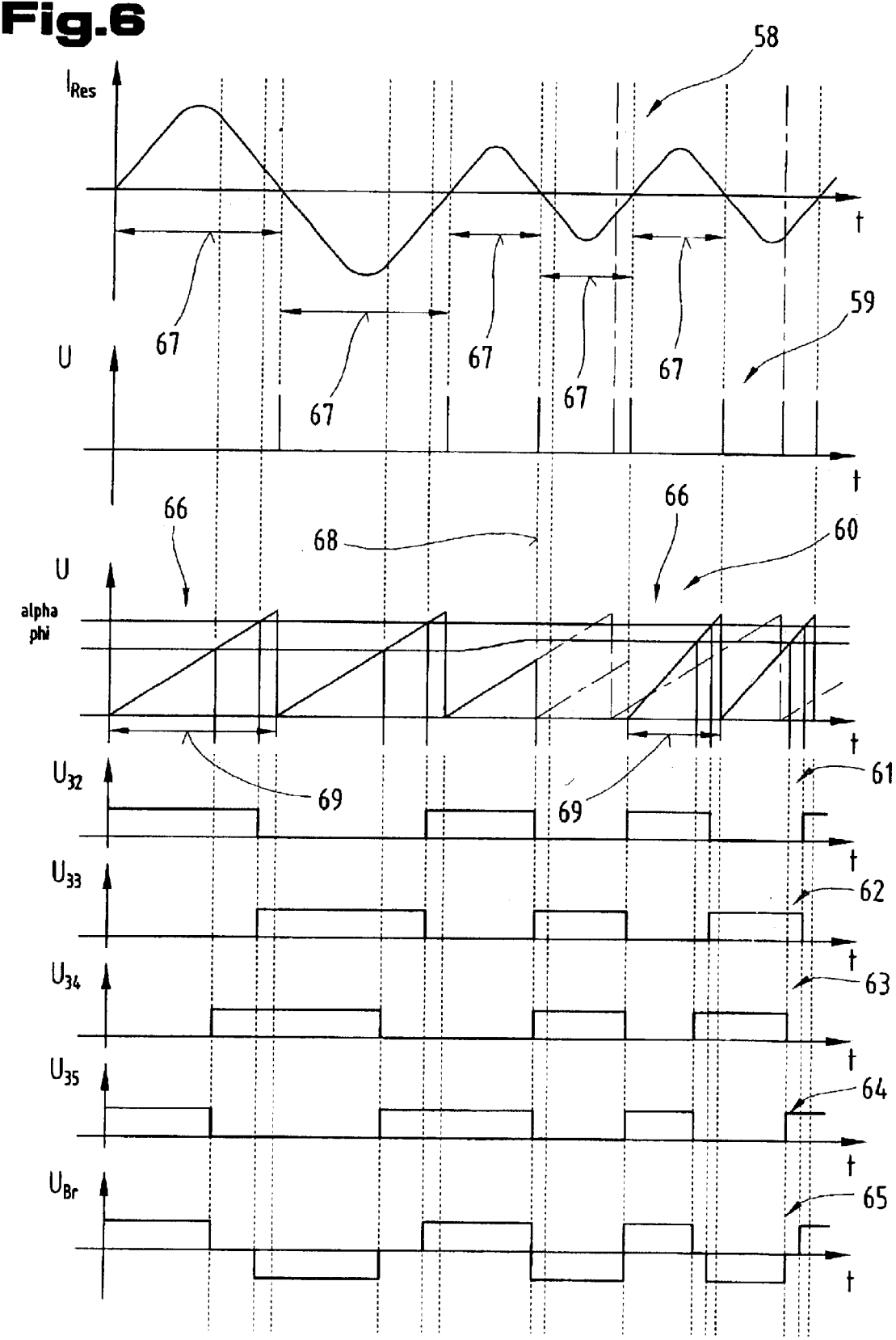
FIG. 6 is a simplified schematic illustration, showing a sequence diagram for controlling the welding current source in the event of an increase in resonance frequency.
Figure 7:
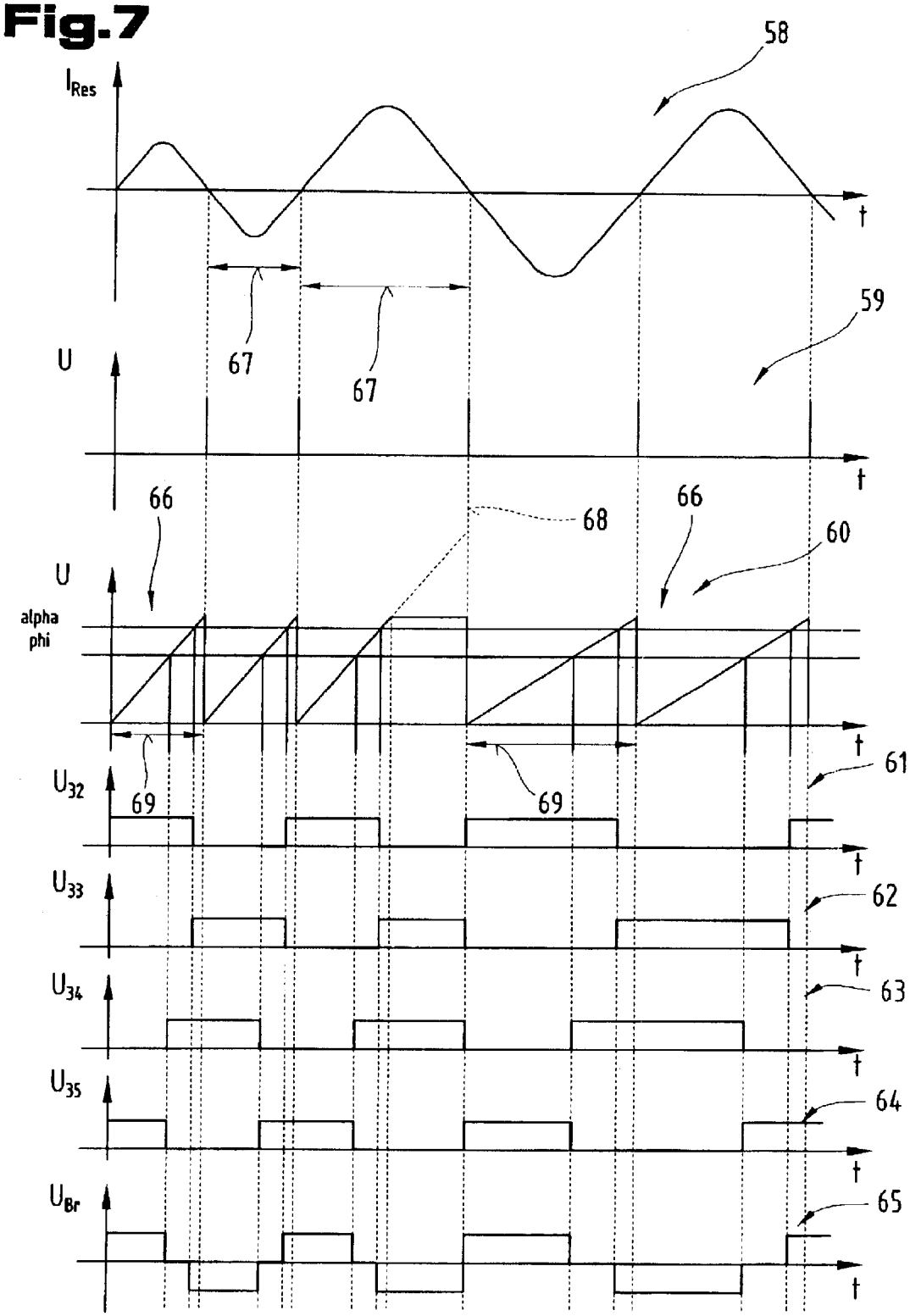
FIG. 7 is a simplified schematic illustration, showing a sequence diagram for controlling the welding current source in the event of a decrease in the resonance frequency.

FIGS. 2 to 7 illustrate an application of the welding current source 2 with a resonant circuit 27, in particular with a serial/parallel converter, FIG. 2 showing a simplified equivalent network of the welding current source 2. FIG. 3 is a sequence diagram illustrating how a bridge circuit 28 of the welding current source 2 is controlled. A schematic illustration showing a frequency curve for the resonant circuit 27 is given in FIG. 4. FIGS. 5 to 7 show characteristic curves for controlling and/or regulating the welding current source 2 with the resonant circuit 27.

Within the structure of the welding current source 2—illustrated in FIG. 2—a power source is schematically indicated by 29. This power source 29 is connected to a power supply network, in particular a public mains network, such as a 230 V or 400 V alternating current network, not illustrated. The alternating current supplied to the power source 29 is converted into a direct current, although it would also be possible to connect a boost chopper or buck chopper downstream, for example.

The power source 29 is connected via lines 30, 31 to the bridge circuit 28 and supplies it with a direct current. The bridge circuit 28 may by a full bridge or of a half-bridge design, the particular embodiment illustrated here having a full bridge, comprising for switching elements 32 to 35 and co-operating freewheeling diodes 36 to 39. The switching elements 32 and 33 are provided in the form of what are known as IGBT transistors and the switching elements as MOSFET transistors, for example.

For control purposes, the individual switching elements 32 to 35 are connected via control lines 40 to 43, shown by dotted-dashed lines, to the control system 4, so that the switching elements 32 to 35 can be activated and deactivated when power is applied to the control lines 40 to 43. Connected at the mid-point of the bridge circuit 28 is the resonant circuit 27, in particular the serial/parallel converter, comprising an inductor 44 and a capacitor 45 connected in series therewith as well as another capacitor 46 connected in parallel with the consumer. In the embodiment illustrated as an example here, the resonant circuit 27 is indicated by broken lines.

A measuring device 47 is provided at the output of the resonant circuit 27 for detecting the current and the voltage in the resonant circuit 27, the measuring device 47 being connected via lines 48, 49 to the control system 4 for transmitting the current level and/or the voltage level. Connected to the measuring device 47 is a rectifier 50, which is illustrated by individual diodes, the output of the rectifier 50 being connected to output terminals 51 and 52 of the welding apparatus 1. The consumer, in particular the welding torch 10, is connected to these output terminals 51 and 52 via the supply lines 17, 18, the welding torch 10 being illustrated as an equivalent electric wiring diagram in the form of an ohmic resistance 53 and a line inductance 54 of the supply lines 17 and 18.

The operating principle of the power source 29, the bridge circuit 28 and the resonant circuit 27, in other words the welding current source 2, will not be described in more detail from an electrical point of view because such an arrangement is already known from the prior art. What will be described is the control method and/regulating method used to supply the consumer, in particular the welding torch 10, with current and voltage in order to perform a welding process.

In principle, it should be pointed out that, as illustrated in FIG. 4, when using a resonant circuit 27, in particular when using a serial/parallel converter, the latter is always operated above or below the resonance frequency, preferably above the resonance frequency. The resonance frequency is set depending on the output mode, in particular the load resistance at the output terminals 51 and 52, in other words the consumer, i.e. the resonance frequency changes whenever there is a change in resistance at the output, in other words at the welding torch 10, due to the occurrence of a short circuit for example, in which case a corresponding frequency band can be set on the basis of the rated capacity of the welding current source 2, in particular the resonant circuit 27. In the case of the frequency curve illustrated in FIG. 4, a characteristic curve is plotted with a minimum resonance frequency 55 and a maximum resonance frequency 56. The minimum resonance frequency 55 switches in whenever a short circuit occurs between the welding wire 13 and the workpiece 16 so that the ohmic resistance 53 becomes zero. The maximum resonance frequency 56 switches in whenever the arc 15 is extinguished between the welding wire 13 and the workpiece 16 because the ohmic resistance 53 becomes infinite.

During operation of the welding current source 2, in other words during a welding process, the resonance frequency of the resonant circuit 27 may shift within these two frequencies as the loads vary, and, in order to ensure safe operation, a bias point 57, schematically indicated on the curves, is fixed on one side of the resonance frequency, in particular above the resonance frequency, and this bias point 57 can be shifted to the required output along the schematically indicated curve at a constant resonance frequency when adjustments or controls are applied by the control system 4. Consequently, different curves occur due to the different output states during a welding process, lying between the minimum resonance frequency 55 and the maximum resonance frequency 56. To this end, the frequency f is plotted on the abscissa of the schematic diagram and the transfer function G on the ordinate, the transfer function G specifying the power multiplier between output voltage and input voltage, i.e. if the transfer function G has a value of 2, the output voltage will be twice the input voltage.

When using the resonant circuit 27 in the welding current source 2 in this manner, however, care should be taken to ensure that when the welding current source 2 is adjusted or controlled, the bias point 57 is always kept on the same side of the resonance frequency, in other words above or below the resonance frequency, because in the event of a changeover to the other side, the control or regulation principle is reversed, i.e. if the bias point 57 is set above the resonance frequency, whenever there is a change in output, in other words whenever there is a change of resistance at the consumer and hence when the resonance frequency is changed, it must again lie above the new resonance frequency.

If, as indicated by broken lines, the bias point 57 is set above this resonance frequency on the curve plotting the minimum resonance frequency 55, for example, there will be a change in resonance frequency and hence the curve, to the maximum resonance frequency 56 whenever there is a rapid change in output, in particular a rapid change of resistance such as would occur on clearing a short circuit. As a result, the bias point 57 will then migrate to the new curve, as shown by the broken line, that is to say below the resonance frequency, which will result in a change in the control principle.

If, for example, the control system 4 is required to apply a reduction in output, a frequency increase will be needed if the bias point 57 is above the resonance frequency so that the bias point 57 can be shifted along the falling curve, as is the case with the characteristic curve of the minimum resonance frequency 55.

Since however, as mentioned above, the bias point 57 was moved below the resonance frequency, as may be seen by the broken lines on the curve of maximum resonance frequency 56, the increase in the resonance frequency will now be generate and apply an increase in output because it is shifted along the rising curve for the maximum resonance frequency 56, for example, in other words on the side below the resonance frequency, which can give rise to faulty functioning of the welding current source 2 as well as faults in components. This particular procedure must be specifically taken into account in particular when the characteristic curve changes from a lower frequency to a higher frequency since in the reverse situation, in other words a change from a higher frequency to a lower frequency, as indicted by broken lines, the bias point 57 is always kept on the same side of the characteristic curve.

However, in order to prevent the bias point 57 from changing sides in this manner, it is necessary to use a control and/or regulation method of the type described below, which will ensure that the bias point 57 is always kept on the fixed side of the characteristic curve accordingly, even when rapid changes occur in the resistance of the consumer as is the case during a welding process, and preferably above the resonance frequency. However, this is very difficult in applications involving a welding current source 2 because very rapid changes in output and changes in resistance can occur, and the welding current sources with a resonant circuit known from the prior art usually have to be re-set in order to be able to apply the corresponding control or correction.

To ensure that a change in the bias point 57 from one side to the other side of the resonance frequency can not occur, a status variable of the resonant circuit 27, is applied as a means of controlling and regulating the welding current source 2, in particular the current curve or the voltage curve in the resonant circuit 27, for example the resonance current 58, as illustrated in FIGS. 5 to 7, in the form of an adjustment or control variable. Instead of the resonance current 58, it would naturally also be possible to apply the resonance voltage in the resonant circuit 27 for adjustment and control purposes, in which case the characteristic curve is shifted by 90E. This ensures that whenever there is a change in frequency in the resonant circuit 27, the bias point 57 is moved or shifted accordingly, i.e. in the event of a change in resistance, in other words a change in load, the welding current source 2 is switched and adjusted at least to the resonance frequency or above the resonance frequency and the bias point 57 is therefore not able to migrate to the other side of the resonance frequency and any shift of the bias point 57 to the correct side of the current characteristic curve can be operated by a frequency increase or frequency reduction accordingly.

In order to be able to describe in more detail how the welding current source 2 is regulated and controlled and in particular how the bridge circuit 28 and its switching elements 32 to 35 are activated, FIGS. 5 to 7 illustrate different regulating and control sequences. For example, FIG. 5 illustrates a regulating and control sequence in the case of a constant resonance frequency, in other words with the output mode of the consumer unchanged, whilst FIG. 6 illustrates the situation in the event of an increase in resonance frequency, such as would occur when a short circuit is broken or when increasing an arc length or extinguishing the arc 15, and FIG. 7 illustrates the situation in the event of a reduction in the resonance frequency such as would occur in the event of a short circuit or when shortening an arc length. The regulation and control sequences illustrated occur unexpectedly in a welding current source 2 and a corresponding adjustment or control has to be carried out every time.

The control and/or regulation procedure is operated on the basis of several parameters and FIGS. 5 to 7 plot a status variable, in particular the resonance current 28 of the resonant circuit 27, a zero crossover detection 59 operated by the control system 4 or measuring device 47, a ramp curve 60 with control variables alpha and phi, as well as voltage curves 61 to 64 of the switching elements 32 to 35 and a voltage curve 65 of the bridge circuit 28. The individual curves in the individual diagrams are synchronous in time.

For regulation and control purposes, several control states S1 to S4 for the bridge circuit 28, in particular its switching elements 32 to 35, are stored in the control system 4, which are called up depending on the prevailing output conditions at the welding current source 2, in other words at the welding torch 10. The possible sequences for applying the individual control states S1 to S4 are indicated by arrows in FIG. 3.

Figure 8:
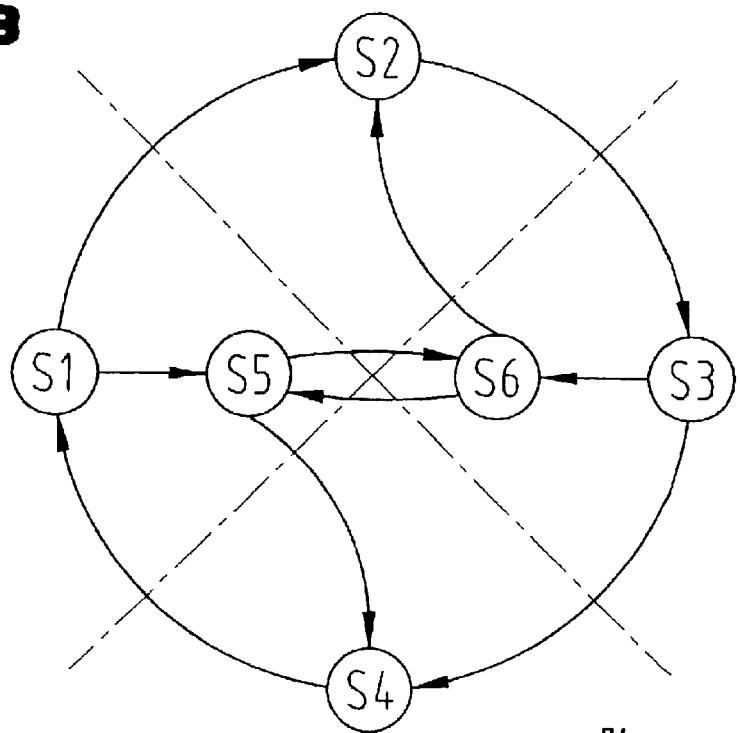
FIG. 8 is a simplified schematic illustration, showing another sequence diagram for the welding current source.

The stored control states S1 to S4 are set out and stored in the table given below and the "on" state for a switching element 32 to 35 is activated accordingly by the control system 4. The table below also shows other control states S5 and S6 , relating to another embodiment—as illustrated in FIGS. 8 and 9.

| Control states: | Switching elements | | | | power supply |
| --- | --- | --- | --- | --- | --- |
| | 32 | 33 | 34 | 35 | |
| S1 | on | off | off | on | positive drive phase |
| S2 | on | off | on | off | positive freewheel |
| S3 | off | on | on | off | negative drive phase |
| S4 | off | on | off | on | negative freewheel phase |
| S5 | off | on | off | off | special operating mode |
| S6 | on | off | off | off | special operating mode |

The specification for the power supply was arrived at on the basis that it describes the power feed into the resonant circuit 27 of the welding current source 2 from the power source 29 via the bridge circuit 28, as illustrated by the voltage curve 65, i.e. during the positive drive phase and the negative drive phase of an intermediate direct current circuit of the welding current source 2, in other words from the power source 29, current flows across the switching elements 32 to 35 into the resonant circuit 27 and hence to the consumer, in particular the welding torch 10, whereas during the positive or negative freewheeling phase, no power supply or no flow of current takes place via the switching elements 32 to 35 of the bridge circuit 28 from the intermediate circuit, but a current circuit is maintained in the resonant circuit 27 and the latter resonates independently.

This being the case, the current flow in the drive phases is generated by activating switching elements 32 and 35 or 33 and 34 in pairs, whereas during the freewheeling phase, switching elements 32 and 34 or 33 and 35 are activated and a common potential is therefore applied to the switching elements 32 to 35 of the resonant circuit 27.

In principle, it should be pointed out that, because of the loss in output which occurs in the components during a switching procedure, the switching elements 32 and 33, for example the IGBT transistors, are switched, shortly before or after a current zero of the resonance current 58 in the resonant circuit 27, to a specific control signal alpha—as per the ramp curve 60—whereas the switching elements 34 and 35, in other words the MOSFET transistors, are switched to a specific control signal, in particular a phase angle phi, of the resonance current 58 in the resonant circuit 27, i.e. the current flow in the resonant circuit 27 is applied as a control and regulating variable and the welding current source 2 with the resonant circuit 27, in particular the serial/parallel converter, is operated at or above the resonance frequency, in other words at or above the characteristic frequency, without having to use or apply an external variable, as is the case with resonators known from the prior art. Naturally, it would be possible to use other transistors and the switching elements 32 and 33 could be provided in the form of MOSFET transistors and the switching elements 34 and 35 as IGBT transistors.

The control and regulating variables needed by the control system 4 to control or regulate the bridge circuit 28 are the control signals alpha and phi and the zero crossing of a status variable, in particular the resonance current 58 or the resonance voltage, the control signal alpha being responsible for activating switching elements 32 and 33 in the region of the current zero and the control signal phi for activating switching elements 34 and 35 at a specific phase angle of the current flow in the resonant circuit 27. The control signals alpha and phi are therefore calculated and set by the control system 4 depending on the required output so that a corresponding pulse width of the bridge circuit 28 can be obtained by activating the switching elements 32 to 35 whilst the control signal of the current zero is generated in synchronisation with the zero crossings of the resonance current 58.

Different methods may be used to generate a pulse width suitable for activating the switching elements 32 to 35. For example, the control signals phi and alpha are converted to a ramp function, for example, as illustrated by the ramp curve 60 in FIGS. 5 to 7, and compared with a ramp signal 66 and when the control signals phi and alpha intersect or coincide with the ramp signal 66, the switching elements 32 to 35 are activated accordingly. However, to enable the ramp signal 66 to be synchronised with the resonance frequency of the resonant circuit 27, the continuously and linearly rising ramp signal 66 is restarted whenever the resonance current 58 crosses zero.

On this matter, it should be pointed out that the values of the control signals alpha and phi at maximum pulse width or pulse breadth, in other words at maximum output power, may be equal in size and the welding current source 2 is operated at the resonance frequency, so to speak, which means that the value of the control signal phi is smaller than alpha at a lower output power, and either both control signals are set simultaneously or the control signal phi is set before the control signal alpha. When operating the welding current source 2 at the resonance frequency, it is also possible for the values of the control signals phi and alpha to correspond to the pulse width of the resonance current, i.e. the values of the control signals will match the maximum value of the ramp signal 66 to be attained, in which case the switching elements 32 to 35 are activated and deactivated simultaneously and immediately after every current zero, in accordance with the switching and control timing. The pulse width is therefore determined by the difference between the two control signals phi and alpha.

Naturally, it would also be possible for this comparison or the process of setting the timing with which the switching elements 32 to 35 are switched on and off to be run in digital format, for example by means of a counter, or on the basis of a simple computation run by the control system 4.

In the embodiment illustrated as an example here, the ramp signal 66 is formed in such a way that it rises to a fixed value within the duration of a half-period of the resonance current 58, in other words between two current zeros, as a result of which a control is applied to the bridge circuit 28 by the control system 4 within the duration of a half-wave or a half-period of the resonance current 58, since the control signals phi and alpha are set during normal operation.

However, because of the different period duration, that is to say because of the different resonance frequencies of the resonant circuit 27 due to differing output conditions, it may be that the duration of a half-wave and the duration of a half-period within which the ramp signal 66 must rise to the set value will be changed because of the change in resonance frequency, i.e. whenever there is a change in output for example, the resonance frequency of the welding current source 2 changes, this change in output being due in particular to a change in resistance at the consumer because a short circuit has occurred, the arc is in operation or the arc is extinguished, which means, for example, that the duration of the period, in particular a half-period 67 of the resonance current 58 can be shortened or lengthened, so that the ramp signal 66 has not yet reached or has already exceeded the set value.

Consequently, in the case of an increase in resonance frequency, for example, the ramp signal 66 can not reach the pre-set value but is already interrupted and re-started at any instant 68, as may be seen form FIG. 6, or in the event of a reduction in the resonance frequency, the value has already been reached or exceeded and a current zero has still not occurred, as may be seen in FIG. 7 at the instant 68.

For example, it may be, as illustrated in FIG. 6, that the control signals phi and alpha for activating the switching elements 32 to 35 lie outside the range, i.e. the ramp signal 66 is interrupted and re-started before reaching the values of the control signals phi and alpha, so that it will no longer be possible to activate the switching elements 32 to 35 depending on the control signals phi and alpha because the current flow or the resonance frequency has changed and the sinusoidal resonance current 58 is therefore been changed from the positive half-wave to the negative half-wave or vice versa before the control signals phi and alpha occur, even though the switching elements 32 to 35 are still switched for the preceding half-wave.

This state is detected in such a way and monitored in such a way by the control system 4 that every current zero of the resonance current 58 is detected by the control system 4 and the control system 4 runs a check after the onset or activation of the current zero to ascertain whether the control signals phi and alpha, which are compared with the ramp signal 66, have already been activated or not so that the control state S1 to S4 to which the switching elements 32 to 33 must be switched can be determined by the control system 4.

The switch between the individual control states S1 to S4 is effected in such a way that when the welding current source 2 is operating in stable normal operation without any change in frequency—as illustrated in FIG. 5—the bridge circuit 28 is switched from the positive drive phase—control state S1—into the positive freewheeling phase—control state S2—and from it into the negative drive phase—control state S3—and then into the negative freewheeling phase—control state S4. The switch made from the negative freewheeling phase to the positive drive phase closes the control circuit. This sequence is run by the control system 4 if the bridge circuit 28 is stable, operating above the resonance frequency as illustrated in FIG. 5, and hence the half-pulse width 67 between the current zeros remains constant or approximately the same.

However, if it happens that the resonance current 58 crosses zero before one of the two control signals phi and alpha or between them, as is the case at instant 68 in FIG. 6 for example, a special control process, in particular a special operating mode, is initiated by the control system 4 in order to synchronise with the new resonance frequency of the resonance current 58 and simultaneously prevent components from damage, in particular the switching elements 32 to 35, due to shutdown at an inadmissible current flow in the form of a change of potential. To this end, the control system 4 switches form a drive phase—control state S1 or S3—into the other drive phase—control S3 or S1—immediately the current crosses zero.

Thereupon, the control system 4 runs a check to ascertain whether the two control signals phi and alpha have already been set or not, before the next current zero. If such is not the case, a switch is effected into the next drive phase, as may be seen in FIGS. 6 and 7. As a result of switching from one drive phase into the next drive phase, the welding current source 2 is operated at the resonance frequency for a brief period when a current zero occurs, in order to prevent the bias pint 57 from shifting to the other side, as described above. Operating at the resonance frequency also provides an opportunity to re-synchronise the bridge circuit 28 and the ramp signal 66 with the new resonance frequency.

To enable a reduction in the resonance frequency to be likewise detected, the control system 4 checks the value of the ramp signal 66 whenever a current zero occurs and ascertains whether the value has been reached or already exceeded so that a special operating mode can be initiated again by the control system 4. Naturally, this monitoring system could also be used for a frequency increase since the control system would merely have to check whether the control signals phi and alpha have already been set in the event of a current zero.

To enable the ramp signal 66 and hence the other control signals phi and alpha to be adapted to the new resonance frequency of the serial/parallel resonant circuit 27, this new period 69, in particular the new half-period 67 within which the ramp signal 66 must reach the set value, is detected by the control system 4, which means that the period for the ramp signal 66 can be reduced or increased by a pre-set process, i.e. the control system 4 constantly detects the period 69 between two current zeros, in other words the half-period 67 of the resonance current 58, and applies a change to the ramp signal 66 accordingly in the event of a variance.

This being the case, it is possible for the ramp signal 66 to be unknown for the duration of a half-period and when the next current zero occurs the ramp signal 66 is generated and adapted within its duration to the new duration 69 so that it can in turn attain the prescribed value within the new duration 69. Consequently, synchronisation to the new resonance frequency takes place within a half-period 67 of the resonance current 58, ensuring that the control signals phi and alpha are re-set and activated if there is no further change in the resonance frequency, thereby enabling stable operation.

On switching from one drive phase into the other drive phase, the switching elements 32 to 35 of the bridge circuit 28 are switched directly to the current zero in accordance with the control states S1 to S4 described above. This is rendered possible because a still very low resonance current 58 with a reversed sign prevails, in other words the change from a positive half-wave into a negative half-wave or vice versa due to a very rapid control, which still enables the switching elements 32 or 33 to be switched off and switched on without destroying the components. The current level can be monitored for this purpose, for example, so that when a fixed value is exceeded, the welding current source 2, in particular the bridge circuit 28, is briefly switched off in order to avoid causing a surge in the switching elements 32 to 35 at an inadmissible current flow, as would occur in the event of an unforeseen change from the positive to the negative half-wave or vice versa.

However, another option is to switch the switching elements 32 to 35 into a special state, in particular special operating mode, on the basis of the control states S5 and S6 —illustrated in FIGS. 8 and 9—as will be described in more detail below.

By switching the bridge circuit 28 from a drive phase into a freewheeling phase, in other words during normal operation and operation above the resonance frequency, and by switching from a drive phase directly into another drive phase during special operating mode or operation at the resonance frequency, the ramp signal 66 needed for control purposes, in particular the duration 69 within which the ramp signal 66 must reach a pre-set value, can be adapted to the resonance frequency, in particular to the duration 69 of the half-wave and a half-period 67 between two current zeros of the resonant circuit 27. The duration for the ramp signal 66 may be changed using a number of methods known from the prior art, for example by adapting to the preceding duration or by a simple percentage increase or reduction, etc. For control purposes, the reduction or increase of the period 69 for the ramp signal 69 is not crucial because in special operating mode, the switching device 4 always switches from a drive phase into another drive phase and does not return to the normal switching cycle again until the control signals phi and alpha are set prior to the next current zero.

However, the welding current source 2, in particular an inverter, can be synchronised with the new resonance frequency by means of the sequence illustrated in FIG. 3 and thus transferred into a special operating mode—based on the control states S5 and S6 illustrated in FIG. 8. This will be described in more detail below.

In summary, therefore, it may be said that the control states S1 to S4 and S1 to S6 for the switching elements 32 to 35 of the bridge circuit 28 can be set by the control system 4 depending on the control signals phi and alpha and the current zero in the resonant circuit 27 and applied accordingly, whereby a switch can be effected from a drive phase into an other drive phase, etc., during operation above the resonance frequency. The switching from one drive phase into the next drive phase continues until it becomes possible to operate above the resonance frequency again, in other words until the current curve in the resonant circuit 27 and the ramp signal 66 have been synchronised and operation of the welding current source 2 with the serial/parallel converter is returned to a state above the resonance frequency and the control signals phi and alpha have been set again.

With regard to the control and/or regulating methods illustrated in FIGS. 5 to 7, it should be pointed out that when a switching element 32 to 35 is activated, it is so in such a way that the serially connected switching elements 32 and 33 or 34 and 35 are switched in a complementary manner, i.e. for example on deactivating the switching element 32 or 34, the switching element 33 or 35 is simultaneously activated later, in particular after what is referred to in technical jargon as a fixed delay-time. However, it would naturally also be possible to switch the individual switching elements 32 to 35 consecutively.

To ensure that the actual welding current for the consumer, in particular the arc 15, can be incorporated in the control and regulation process, another measuring device 70 is provided at the output of the welding current source 2 for detecting the output current and the output voltage. It is in turn connected via lines 71, 72 to the control system 4 so that the output current can be regulated to the pre-set desired value. It is necessary to incorporate the output current in the control and regulation process in order to set and compute the pulse width for the bridge circuit 28 so that the bias point 57 can be shifted along the set characteristic curve in accordance with the requisite output—as illustrated in FIG. 4—by varying the pulse width, and it may therefore be said that the bridge circuit 28, in particular the half-bridge or full bridge, is controlled by a process of pulse width modulation combined with a variable period duration or period of time.

The sequence of the method proposed by the invention as a means of regulating a welding current source 2 with a resonant circuit 27 may therefore proceed in the manner described below, for example.

The energy supplied by a power source is fed via the bridge circuit 28 to the resonant circuit 27, in which a consumer is disposed. The consumer is usually an arc 15 of a welding process, which is supplied with voltage and current pulses during normal operation, generated by the bridge circuit 20 by means of the switching elements 32 to 35 28. During normal operation, the bridge circuit 28 and its switching elements 32 to 35 are controlled by the control system 4 in such a way that a bias point 57 on the characteristic curve of the resonant circuit 27 lies outside a resonance frequency. This normal operation occurs if a more or less constant resistance prevails at the consumer. If the resistance of the consumer changes, this will lead to a change in resonance frequency. In order to enable fault-free operation of the switching elements 32 to 35 in a phase of variation of the resistance of the consumer, the latter are switched at least to the resonance frequency of the resonant circuit. The switching elements 32 to 35 are switched so that the bias point 57 is always on the same side during a control process, in particular on the falling or rising side of the characteristic curve of the resonant circuit 27, in other words is always kept on the same side relative to the resonance frequency. The side on which the bias point 57 lies relative to the resonance frequency is fixed by the position of the bias point 57 on the characteristic curve of the resonant circuit 27 at which the bias point 57 was located immediately prior to the change in resistance at the consumer. This basic process sequence applies to all embodiments of the present application, the only difference residing in the nature of the control states and the switching duration of the switching elements 32 to 35 in accordance with the control states S1 to S4 described with reference to the embodiment illustrated in FIGS. 2 to 7 and the control states 1 to 6 explained with reference to the embodiment illustrated in FIGS. 8 and 9.

FIGS. 8 and 9 illustrate another embodiment of the method of controlling and/or regulating the bridge circuit 28, for which the control states S5 and S6 are used.

The individual switching elements 32 to 35 are again activated depending on the output conditions at the output terminals 51, 52, and, during stable operation, in other words above the resonance frequency, the welding current source 2, in particular the switching elements 32 to 35 of the bridge circuit 28, are switched from a drive phase S1 or S3 into a freewheeling phase S2 or S4, as illustrated in FIGS. 2 to 7. However, if a change in output occurs, in particular a change in resistance at the consumer, the resonance frequency of the resonant circuit 27 also changes, as described in detail above with reference to FIGS. 2 to 7.

In this embodiment, there is no longer a switch from one drive phase S1 or S3 into another drive phase S3 or S1—as described with reference to FIGS. 2 to 7—and instead, a switch is made into a special operating mode, in which the control states S5 and/or S6 are used, depending on the control, state S1 to S4 which prevails in the bridge circuit 28 at the time. As a result of this special operating mode, when a change in output occurs or an increase or reduction in the resonance frequency, the control system 4 switches the switching elements 32 to 35, from the drive phase S1 or S3 into the special control state S5 or S6 as indicated in the table above, in which case the switching elements 34 or 35 are deactivated and the associated switching elements 33 or 32 remain active. As a result, the current flow via the bridge circuit 28 from the power source 29 is actively interrupted and the welding current source 2, in particular the inverter, can be adapted to and synchronised with the new resonance frequency. By providing the freewheeling diodes 36 to 39 and as a result of the integrated freewheeling diodes of the power transistors, however, the circuit of the resonant circuit 27 is maintained, so that the current zeros of the resonance current 58 can still be evaluated by the control system 4 and hence the synchronisation process operated.

This can be seen with effect from the instant 68 in the embodiment illustrated in FIG. 9. At this instant 68, the control system 4 detects that the current zero, described above, was set before the control signals phi and alpha, which means that it is no longer possible to switch into one of the next control states S1 to S4. The bridge circuit 28 is now controlled by the control system 4 in such a way that a switch is made from the currently prevailing drive phase S1 into the control state S5—illustrated in FIG. 8—for which purpose the switching element 32 is deactivated and the switching element 33 activated. Switching element 35 is simultaneously deactivated so that the current flow across the bridge circuit 28 is actively interrupted but the flow of current for the resonant circuit 27 via the freewheeling diode 39 of switching element 35 continues to be maintained. As described above, the duration 69 for the ramp signal 66 can now be changed in a whole range of ways in order to synchronise with the new resonance frequency rendering operation above the resonance frequency possible again.

In principle, it should be pointed out that as a result of the independent resonance of the resonant circuit 27, including outside of the drive phases, a flow of current is available in the resonant circuit 27 and the current zeros can be constantly evaluated by the control system 4, which also means that it is possible to synchronise during the control states S5 and S6 in the special operating mode. Consequently, as a result of the storing the control states S1 to S4 in a defined manner, they can be assigned to the current zeros, in particular the half-periods of the resonance current 58, so that a controlled rise to a level above resonance frequency is possible in normal operation—in accordance with the control states S1 and S4 of FIGS. 2 to 7 or S5 and S6 of FIGS. 8 and 9 on the basis of the control states S1 and S4. The switch to the special operating mode S5 and/or S6 is therefore undertaken by the control system 4 in this embodiment by increasing or reducing the resonance frequency, the detection and monitoring system being as described above with reference to FIGS. 1 to 7.

When the embodiment is in the state illustrated, when the next current zero occurs, a switch is made from the control state S5 to the control state S6 and then from there to the control state S4, and, once synchronisation has been completed in the disconnected control state S1, the next drive phase can be initiated. This being the case, it is possible to switch backwards and forwards several times between the control states S5 and S6 or, after the first control state S5, back into the normal control circuit, or after the special operating mode has been called up for the first time—control state S5 or S6 —there will necessarily be a forced switch to the next control state S6 or S5 before returning to normal operation. However, on leaving normal operation, it is necessary to revert to the correct control state S1 to S4 of the control sequence in normal operation. This is necessary because the sinusoidal course of the resonance current 58 at a current curve with a falling potential and an incorrectly assigned control state S1 to S4 can lead to surging in the components.

Consequently, it is necessary for the control system 4 to be able to assign the control states S1 to S4 to the currently prevailing half-periods of the resonance current 58 on a constant basis so that after synchronisation, the bridge circuit 28 can be switched back to normal operation at the correct point in time.

With the embodiments described above and illustrated in FIGS. 1 to 9, it is also possible to depart from the illustrated control states S1 to S6 and run a special control process, which will be described below. This is necessary because when using a welding current source 2 with a resonant circuit 27, it must always be operated above or at the resonance frequency and if there are unexpected and strong changes in output, in particular changes in the resistance of the consumer, it is possible that the synchronisation can not always be operated within a pre-set and pre-adjustable period and the maximum admissible desired values may be exceeded accordingly. If the synchronisation procedure takes too long, a situation can arise in which the independent frequency of the resonant circuit 27 adjusts and it is therefore no longer possible to operate the welding current source 2 because the control states S1 to S6 can no longer be assigned to the half-periods of the resonance current 58 and the welding current source 2 therefore has to be re-started and run back up again.

Figure 10:
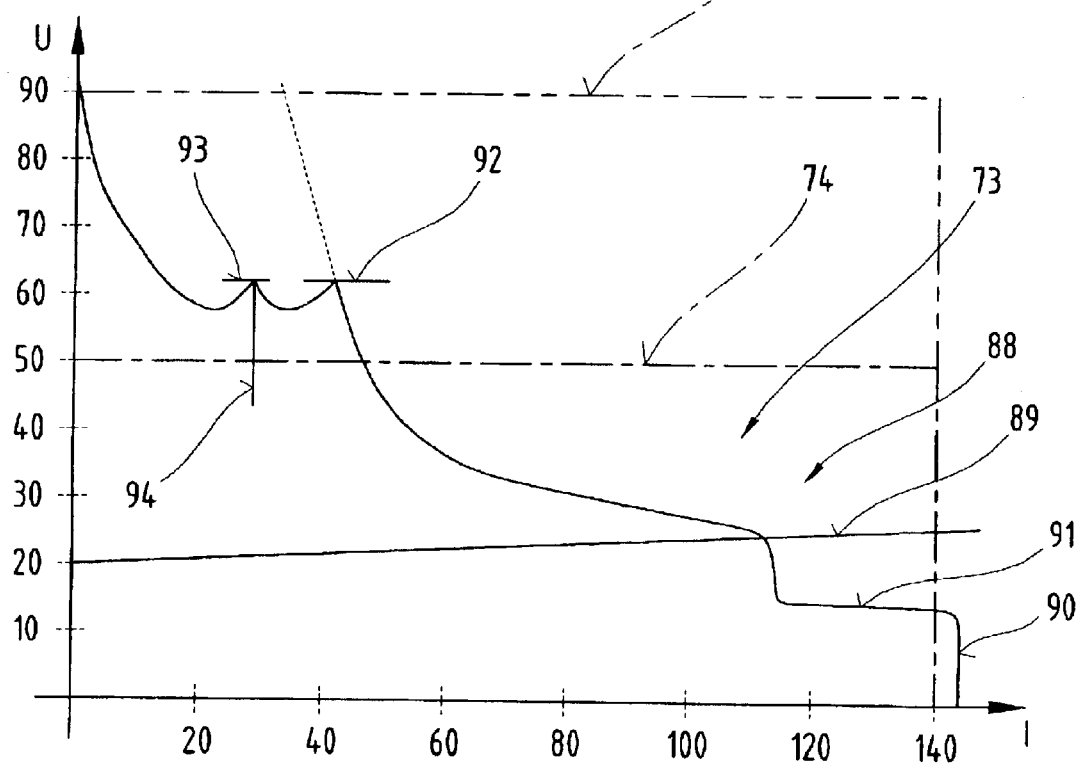
FIG. 10 is a simplified schematic illustration, showing an output curve of the welding current source.
Figure 11:
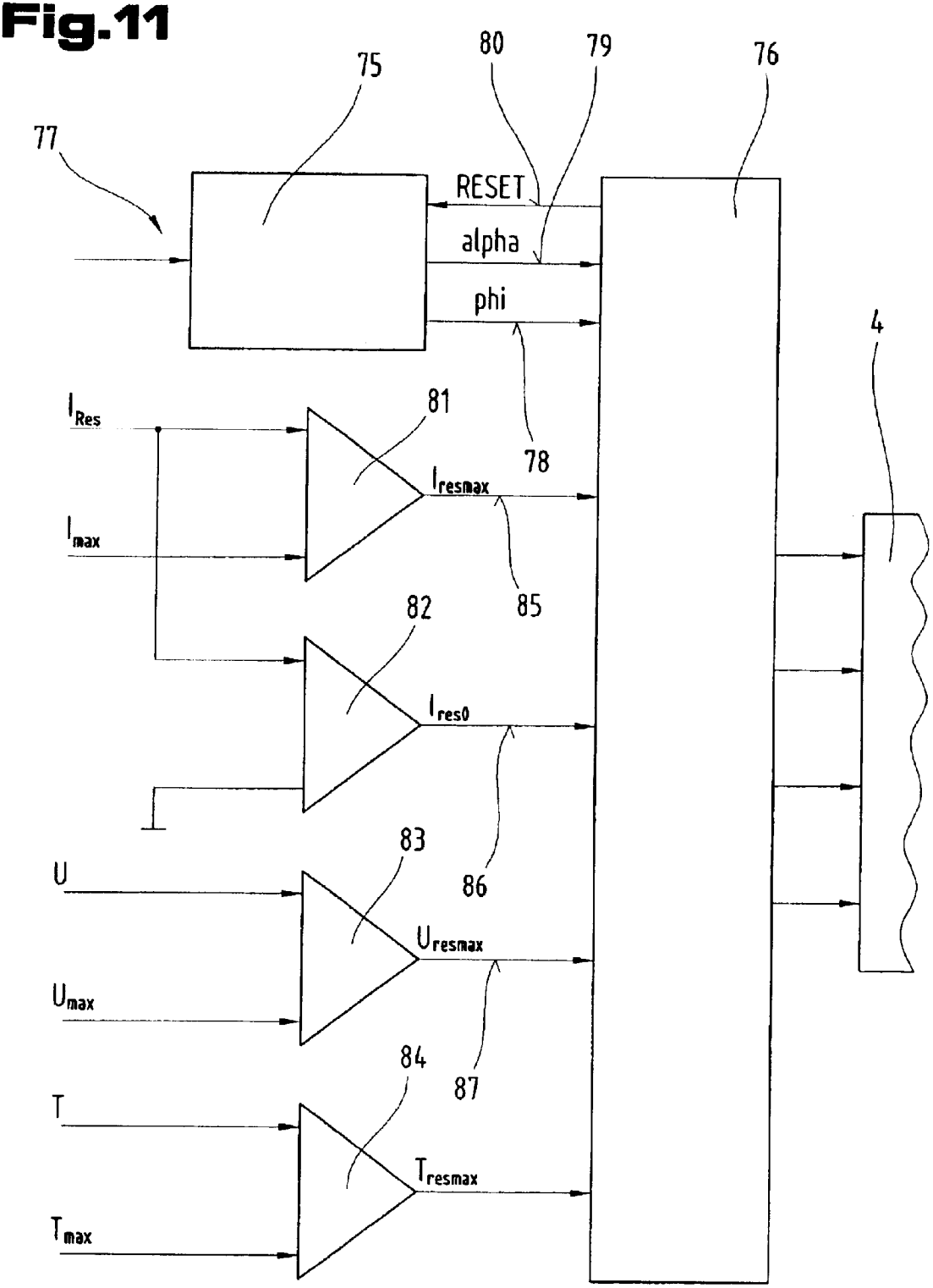
FIG. 11 is a simplified schematic illustration, showing a block diagram of the circuit for regulating or controlling the welding current source.

FIGS. 10 and 11 provide schematic illustrations of embodiments for running a special control process. FIG. 10 shows an output curve 73 of the welding current source 2, obtained using the resonant circuit 27 and controlling the control states S1 to S6 as well as the special control process. FIG. 11, on the other hand, is a block diagram illustrating the possible parameters for the special control process, which are fed into the control system 4 and applied for subsequent processing.

This output curve 73 plots the output voltage U on the ordinate and the current I on the abscissa, the output curve 74 plotted in broken lines being that which would apply using the prior art.

In the block diagram given in FIG. 11, a converter 75 is connected to a logic unit 76 and the measurement signals from the measuring devices 47 and/or 70 are applied to an input 77 of the converter 75, thereby enabling the control signals phi—line 78—and alpha—line 79—to be generated. A control line 80 is also shown, by means of which the logic unit 76 is able to reset the converter 75, in other words a RESET signal is transmitted. The block diagram given in FIG. 9 may be applied as an equivalent circuit diagram for the control system 4, i.e. the functions illustrated will be run by the control system 4.

Several comparators 81 to 84 are also provided, the purpose of which is to compare the current and voltage values supplied by the measuring devices 47 and/or 70 during operation, in other words the actual values, with corresponding stored desired values, so that a control can be applied whenever the desired values are exceeded, thereby preventing damage to the components due to too high current and/or voltage values. The purpose of the comparator 81 is to compare the resonant current "I res" supplied by the measuring device 47 with a predetermined maximum permissible current "I max", and output a signal "I resmax" to the logic unit 76 via a line 85 whenever the desired current "I max" is exceeded. The other comparator 85 in turn compares the resonant current "I res" with the zero potential and a signal is transmitted via line 86 whenever the resonant current "IresO" crosses zero and forwarded to the logic unit 75.

The other comparator 83 compares the welding voltage "U" from the measuring device 70 with a pre-set maximum permissible desired voltage "U max" and whenever this desired voltage "U max" is exceeded, a signal "U resmax" is transmitted to the logic unit 75 via a line 87.

The other comparator 84 is used to monitor the temperature "T" for a cooling unit provided in the welding apparatus 1 with a maximum desired value "T max". Naturally, it would also be possible to use other monitoring systems known from the prior art to ensure safe operation of the welding current source 2.

In principle, it should be pointed out that—as shown by the curve of FIG. 10—the welding current source has a rated capacity to generate a maximum output current at a corresponding output voltage and is therefore capable of supplying a high voltage such as required for ignition purposes. In the case of the output curve 74 based on the prior art, at a maximum output current of 140 A and an output voltage of 50 V, the welding current source must generate an output of 7 kW in order to in order ignite the arc 15.

By using the welding current source 2 with the resonant circuit 27 proposed by the invention, a maximum output voltage of 90 V at a potential output current of 140 A is possible for igniting the arc 15, a mean value of the illustrated curve being used as the basis for rating the capacity of the welding current source 2, which means the welding current source 2 would therefore able to achieve an output of approximately 5 kW, i.e. as a result of the course of the special course of the output curve 73, a very high output voltage is available at a low current flow, and the high output voltage thereby ensures that a stable arc 15 can be generated at a low current flow and the arc 15 can be ignited due to the high output voltage.

The special course of the output curve 73 is achieved due to the fact that a correspondingly high amount of energy is available in the resonant circuit 27, in other words in the inductor 44 and in the capacitors 45, 46, which can be forwarded to the output for igniting and maintaining the arc 15 and for triggering a short circuit, without the welding current source 2 having to be rated to the specific capacity to generate this output voltage and the possible output current.

With regard to the illustrated output curve 73, the current and voltage specifications on the diagram are based on an embodiment of a welding current source 2, in which, as a result of changing the rated capacity of the resonant circuit 27 and the power component 3 accordingly, the values for the output curve 73 can be varied, i.e. the maximum output voltage and the maximum output current can be varied on the basis of the rating and the settings for the maximum possible values "I max and U max".

Consequently, if using a welding current source known from the prior art, it would be possible to obtain a rating of 90 V for the maximum output voltage and a maximum output current of 140 V, in which case this welding current source would have to supply an output of 12.6 kW as indicated by the output curve 74 shown in broken lines. For a standard welding process, such as can be operated by the welding current source 2 proposed by the invention with an output of 5 kW, this welding current source would therefore have considerably overrated capacity and would simultaneously mean having to use a much bigger and heavier welding current source.

The schematically illustrated output curve 73 shown in FIG. 10 for the welding current source 2 proposed by the invention is generated by the fact that the components and the power component 3 can be rated to provide a corresponding energy supply, whereby the special course of the plotted output curve 73 is generated as a result of the influence of the resonant circuit 27, i.e. the output curve 73 can basically correspond to a rectangular diagram of the broken line of a characteristic curve as plotted on the basis of the prior art and the energy available in the resonant circuit 27 can be used to change the output curve 73 in accordance with the schematic diagram.

For example, starting from a current value 88 of approximately 110 A, it is possible to supply an output voltage of approximately 25 V for the welding process. This is necessary because, as indicated by another standard characteristic curve 89, an output voltage of approximately 25 V is necessary for a welding process with an output current of this type. Starting from a rated capacity of the welding current source 2 in the range illustrated by the current value 88, the welding current source 2 is able to deliver a maximum output current 90 of 140 A, for example, with a lower output voltage 91 of approximately 15 V, as a result of which more power can be supplied for resolving a short circuit, making continuous operation of the welding apparatus at a current corresponding to the current value 88 possible. By reducing the current, the welding current source 2 increases the voltage and a reduction to approximately 60 A will give rise to an increase in the voltage to 40 V, for example. From this point, an exponential voltage increase occurs, and the output voltage—as illustrated in FIG. 11—is monitored so that when the maximum permissible desired voltage U max is exceeded, corresponding to a voltage value 92, the control system 4 initiates the special control process described below, thereby limiting the voltage. If this were not the case, the voltage would rise infinitely as indicated by the broken line, in other words would be limited by the power losses of the components, which would damage the components. As a result of the special control process initiated by the control system 4, the voltage is controlled and limited to a pre-defined value.

The advantage of this type of output curve 73 resides in the fact that, with a low current flow, a corresponding high output voltage is available for maintaining the arc 15, so that the power component and the welding current source 2 can be kept to a low capacity rating since the extra energy that is needed can be supplied from the resonant circuit 27.

Since the resonance frequency of the serial and/or parallel resonating circuit, in particular the resonant circuit 27, in the welding current source 2 is set depending on the output state at the consumer, when there is a significant change in output, in particular significant changes in resistance, a situation may arise in which the synchronisation can not be completed in a given time and the naturally resonating resonant circuit 27 will automatically be terminated. This situation can happen because even during a freewheeling phase or during the special operating mode in which no energy is supplied by the power source 29, energy is discharged to the consumer causing energy to be lost by the natural component losses on the current source, which means that the welding current source 2 has to be re-started and run up again.

To prevent this from happening, the control system 4 can run the control and/or regulating process with the special operating mode described above by switching from a drive phase into another drive phase or into the special operating mode S5 or S6 to run a special control process. To this end, whenever a parameter is exceeded, in particular the resonance current 58 or the welding voltage, it is possible to call up and run a special control process by means of a pre-set desired value.

In effect, if there is a change in output, the control system 4 switches the bridge circuit 28 to the special state S5 and S6 , in which case the control system 4 will monitor how often a switch is made from a special state S5 or S6 into another special state S6 or S5. The number of times switching may be operated backwards and forwards between the special states S5 and S6 is stored in the control system 4 and is preferably four times. If switching backwards and forwards between the special states S5 and S6 has happened too often, the naturally resonating resonant circuit 27, in particular the resonance current 58 and/or the resonance voltage, would be drained because of the component losses and it would no longer be possible to run a welding process because the power source 29 would not be able to supply the resonant circuit 27 with energy.

If the special operating mode, in other words call-up of the control states S5 or S6 , exceeds the pre-set switching value—preferably four times—the control system 4 switches the bridge circuit 28 into the special control process, as a result of which the switching elements 32 to 35 are activated in the form of the drive phases. This being the case, however, the pulse width is reduced to a minimum so that the power source 29 can generate a low energy feed, thereby maintaining the resonance of the resonant circuit 27. The supply of energy my therefore be applied over several periods and the duration of the period or the number of periods is stored in the memory system 4 so that when this special control process has been completed, the system can be returned to the control state S5 or S6 which prevailed before and monitoring re-initiated to ascertain whether it will now be possible to run a synchronisation. A return to the previously prevailing control state S1 to S6 is possible at any time because the control states S1 to S6 can be correlated by the control system 4 to the half-periods of the resonance current 58, even during the various special situations, which means that it will always be possible to return to a specific control state S1 to S6 at any time.

As a result of the resonance of the resonant circuit 27, the voltage is able to rise above a pre-set maximum voltage value and/or current value—illustrated in FIGS. 10 and 11—so that when a situation of this type occurs, the control system 4 an in turn run a special control process. This monitoring process is briefly illustrated in FIG. 11 by the described and illustrated parameters that are monitored. If such a situation arises, the pulse width for the bridge circuit 28 is firstly reduced to a minimum. Simultaneously, a monitoring process ascertains whether, after the resonance current 58 has crossed zero once or more, the signal "I resmax and/or U max" has fallen below the corresponding desired value or not. The process of counting the number of current zero crossings can be pre-set for the purpose of reducing the parameters below the desired values and stored in the control system 4. This procedure can be run several times but every time a specific number of such control attempts has been exceeded, the control system 4 deactivates the bridge circuit 28, i.e. all switching elements 32 to 35 are deactivated, so that the resonance current 58 and the resonance voltage in the resonant circuit 27 are able to compensate for the component losses, thereby enabling the welding current source 2 to be re-started and run back up again.

A control procedure of this type is illustrated in the diagram of FIG. 10. In this case, as the output current drops, the voltage, in particular the voltage value 92, of the output curve 73 rises above a pre-settable voltage desired value "U max", corresponding to the voltage value 92. If a special control process were not run in this situation, the voltage would continue to rise as indicated by the broken line. As a result of this high voltage, components, in particular diodes and power transistors, cold be damaged and it would be necessary to use higher-capacity components in the welding current source 2 than necessary. Consequently, if the voltage is at the desired value and has thus reached the voltage value 92, the pulse width can be reduced so that less energy is now supplied and the voltage is reduced again due to the component losses and/or the energy supplied to the consumer. The control system then switches back to normal operation, in other words to one of the control states S1 to S4.

It may be, however, that the desired value is exceeded, as illustrated by the voltage value 93 on the output curve, for example, causing the pulse width to be reduced to a minimum over a pre-settable number of half or full periods. This special control process can continue to be run until the resonant circuit 27 no longer contains any energy or, having reached a predetermined number of these control attempts, the bridge circuit 28 is deactivated by the control system 4 so that any remaining energy in the resonant circuit 27 is run down. This is what is happening with effect from the instant 94, at which the energy decreases exponentially, i.e. the voltage increases exponentially and the current drops constantly. What this also means is that a very high voltage is available at the start of a welding process and for re-igniting the arc 15. It is also possible to stored different voltage desired values for different current values, enabling an exponential curve of this type to be generated.

Consequently, it may be said that whenever a predefined and adjustable desired value is exceeded, the control system 4 runs a special control process, for which purpose the pulse width for the bridge circuit 28 is reduced to a minimum and, after the resonance current 58 has crossed zero once or more, the bridge circuit 28 is deactivated. To this end, at least the output voltage at the consumer, in other words at the output terminals 51 and 52, and the resonance current 58 are monitored and compared with a desired value.

In summary, it may be said that if using the welding current source 2 with the resonant circuit 27 in the form of a serial/parallel converter, the described method is such that in order to control the bridge circuit 28, in particular half or full bridge, several fixed, pre-set control states S1 to S6 for the switching elements 32 to 35 of the bridge circuit 28 are stored for the purpose of controlling the bridge circuit 28, and; in a sequence controlled by the control system 4 during normal operation, in other words above or below the resonance frequency, a status variable of the resonant circuit 27, in particular the resonance current 58 or the resonance voltage of the resonant circuit 27, the bridge circuit 28 is controlled on the basis of the control states S1 to S4 successively, so that whenever a change in output occurs, in particular a change in resistance, at the consumer, a special operating mode is run by the control system 4 with the bridge circuit 28 in or at the natural frequency of the resonant circuit 27 corresponding to the control states stored for the special operating mode, in particular the control states S1 or S4 and S5 or S6, whereby, in the individual operating modes, in particular during normal operation, in special operating mode and/or during the special control process, the individual control states S1 to S4 for normal operation are assigned to the independently resonating resonant circuit 27, in particular the current zeros of the resonance current 58 or the resonance voltage, by the control system 4 and the control states S1 to S4 are therefore dependent on the status variable of the resonant circuit 27, in particular the current zeros of the resonance current 58 or the resonance voltage.

Consequently, the welding current source 2 can be run in several operating modes, in particular a normal operating mode, a special operating mode and a special control process, so that the control system 4 is able to regulate the welding current source 2, in particular the bridge circuit 28, in such a way that, in the event of a change in the characteristic curve of the resonant circuit 27—as illustrated in FIG. 4—the bias point 57 is always kept on the same side, in particular on the falling or rising characteristic curve of the resonant circuit 27.

Figure 12:
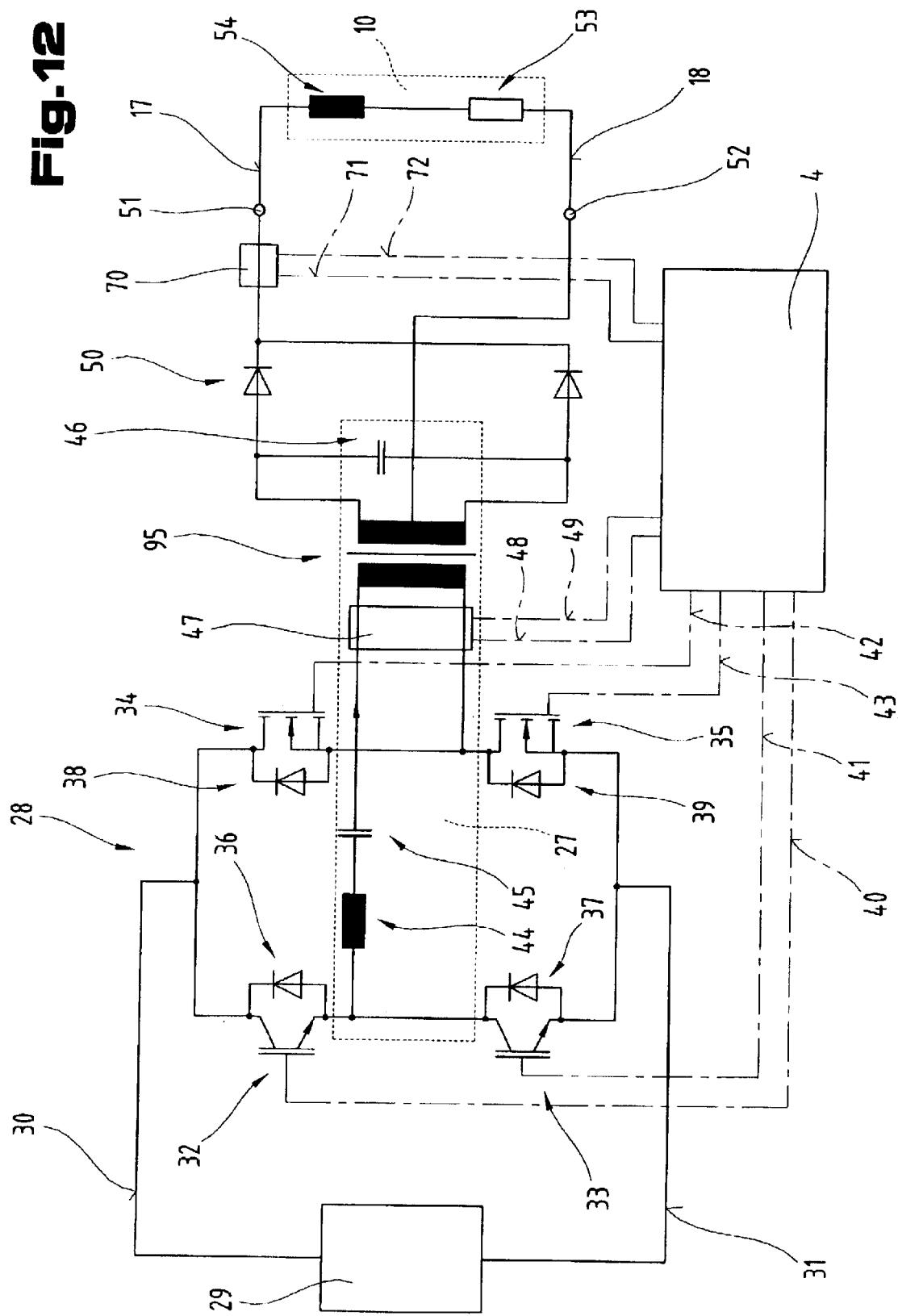
FIG. 12 is a simplified schematic illustration, showing another circuit diagram for a welding current source with a resonant circuit.

With a welding current source 2 having a resonant circuit 27 of this type, it is also possible to use a current converter 95, in particular a transformer, in which case the energy supplied by the power source 29 can be converted. If provided, the current converter 95 may be arranged between the bridge circuit 28, in other words the resonant circuit 27, and the rectifier 50, as illustrated in FIG. 12. However, it would also be possible for a current converter 95 of this type to be arranged in the power source 29 itself.

Finally, it should be pointed out that the individual parts and components or groups of components described with reference to the embodiments are illustrated in a simplified, schematic format. Furthermore, individual parts of the combinations of features described above or features of the individual embodiments described as examples may be used in combination with other individual features from other embodiments and may thus be construed as independent solutions proposed by the invention Above all, subject matter relating to the individual embodiments illustrated in FIGS. 1, 2, 3, 4, 5, 6, 7; 8, 9; 10, 11; 12 can be construed as independent solutions proposed by the invention. The tasks and solutions can be found in the detailed descriptions relating to these drawings.

List of reference numbers

| | | | |
|---|---|---|---|
| 1 | Welding apparatus | 31 | Line |
| 2 | Welding current source | 32 | Switching element |
| 3 | Power component | 33 | Switching element |
| 4 | Control system | 34 | Switching element |
| 5 | Switching element | 35 | Switching element |
| 6 | Control valve | 36 | Freewheeling diode |
| 7 | Supply line | 37 | Freewheeling diode |
| 8 | Gas | 38 | Freewheeling diode |
| 9 | Gas storage | 39 | Freewheeling diode |
| 10 | Welding torch | 40 | Control line |
| 11 | Wire feed device | 41 | Control line |
| 12 | Supply line | 42 | Control line |
| 13 | Welding wire | 43 | Control line |
| 14 | Supply reel | 44 | Inductor |
| 15 | Arc | 45 | Capacitor |
| 16 | Workpiece | 46 | Capacitor |
| 17 | Supply line | 47 | Measuring device |
| 18 | Supply line | 48 | Line |
| 19 | Cooling circuit | 49 | Line |
| 20 | Flow indicator | 50 | Rectifier |
| 21 | Water container | 51 | Output terminal |
| 22 | Input and/or output device | 52 | Output terminal |
| 23 | Hose pack | 53 | Resistance |
| 24 | Connector device | 54 | Line inductance |
| 25 | Tension relieving device | 55 | Minimum resonance frequency |
| 26 | Housing | 56 | Minimum resonance frequency |
| 27 | Resonant circuit | 57 | Operating point |
| 28 | Bridge circuit | 58 | Resonance current |
| 29 | Power source | 59 | Zero crossing detection |
| 30 | Line | 60 | Ramp curve |
| 61 | Voltage curve | 91 | Output voltage |
| 62 | Voltage curve | 92 | Voltage value |
| 63 | Voltage curve | 93 | Voltage value |
| 64 | Voltage curve | 94 | Instant |
| 65 | Voltage curve | 95 | Current converter |
| 66 | Ramp signal | | |
| 67 | Period | | |
| 68 | Instant | | |
| 69 | Duration | | |
| 70 | Measuring device | | |
| 71 | Line | | |
| 72 | Line | | |
| 73 | Output curve | | |
| 74 | Output curve | | |
| 75 | Converter | | |
| 76 | Logic unit | | |
| 77 | Input | | |
| 78 | Line | | |
| 79 | Line | | |
| 80 | Control line | | |
| 81 | Comparator | | |
| 82 | Comparator | | |
| 83 | Comparator | | |
| 84 | Comparator | | |
| 85 | Line | | |
| 86 | Line | | |
| 87 | Line | | |
| 88 | Current value | | |
| 89 | Standard characteristic curve | | |
| 90 | Output current | | |

What is claimed is:

1. Method of controlling a welding current source (1) having a resonant circuit (27), provided in the form of a serial/parallel converter, whereby a bridge circuit (28), comprising individual switching elements (32–35), is controlled by a control system (4) and a consumer, in particular a welding process, is supplied with energy, in particular with voltage and current pulses from a power source (29), controls the bridge circuit (28), whereby the control system (4) controls the bridge circuit (28) during normal operation in such a way that the bridge circuit (28) is switched by the control system (4) consecutively on the basis of the control states (S1–S4) stored in the control system (4) so that the bias point (57) on a character curve of the resonant circuit (27) lies outside a resonance frequency and whenever a change in resistance occurs at the consumer, the control system (4) operates with the bridge circuit (28) is operated at the natural frequency of the resonant circuit (27) on the basis of the control states and sequence stored for the special operating mode, characterised in the control states (S1–S4) fixed for normal operation of the bridge circuit (28) provided as a full bridge are a positive drive phase—control state (S1)–, a positive freewheeling phase—control state (S2) —, a negative drive phase—control state (S3)—and a negative freewheeling phase—control state (S4)—and, in the special operating mode, the bridge circuit (28) is switched from a drive phase—control state (S1 or S3)—preferably consecutively, into one of several alternative control states (S5 or S6) in which the switching elements (34; 35) of one bridge branch are deactivated and the switching elements (33; 32) of the other bridge branch remain activated and the control system (4) monitors how often a switch is made from one special mode (S5; S6) to the other special mode (S6; S5).

2. Method as claimed in claim 1, characterised in that a sequence of control states (S1–S4) of the switching elements (32–35) of the bridge circuit (28) is stored in the control system (4).

3. Method as claimed in claim 1, characterised in that the control states (S1–S4) are activated during a constant state in the conditions at the consumer, on the basis of a time difference between two immediately consecutive current zeros of a status variable of the resonant circuit (27).

4. Method as claimed in claim 1, characterised in that the individual control system (S1–S4) for normal operation, are derived from and/or assigned to a current zero of a status variable of the independently resonating circuit (27) in particular by the control system (4).

5. Method as claimed in claim 1, characterised in that the control system (4) continuously and repeatedly switches between the individual control states (S1–S4) when the welding current source (2) is running in normal operation.

6. Method as claimed in claim 1, characterised in that in the special operating mode, the control system (4) switches the bridge circuit (28) directly from a drive phase—control state (S1 or S3)—into the other drive phase—control state (S3 or S1) whenever the current zero occurs.

7. Method as claimed in claim 1, characterised in that in the bridge circuit (28), in particular the half or full bridge, is controlled by a process of pulse-width modulation combined with a variable period duration, with control signals phi and alpha.

8. Method as claimed in claim 1, characterised in that, depending on the control signals phi and alpha and the current zero of a status variable of the resonant circuit (27), in particular the current zero in the resonant circuit (27), the control system (4) sets the control states (S1–S6 ) for the switching elements (32 to 35) of the bridge circuit (28) and applies these accordingly.

9. Method as claimed in claim 1, characterised in that the switching elements (32 and 33), in particular IGBT transistors, are switched to a control signal alpha shortly before or after a current zero of the resonant circuit (27) and the switching elements (34 and 35), in particular MOSFET transistors, are switched to a control signal phi, in particular a phase angle phi of the current in the resonant circuit (27).

10. Method as claimed in claim 1, characterised in that the control and regulating variables for the control system (4) for controlling or regulating the bridge circuit (28) are generated by the control signals alpha and phi and by a status variable of the resonant circuit (27) crossing zero, in particular the resonance current (58) or the resonance voltage.

11. Method as claimed in claim 1, characterised in that during the positive drive phase—control state (S1)—and the negative drive phase—control state (S3)—a flow of current passes from the intermediate circuit of the welding current source (2), in other words from the power source (29), via the switching elements (32 to 35) into the resonant circuit (27) and hence to the consumer, in particular to the welding torch (10), whereas during the positive or negative freewheeling phase control state (S2; S4)—no power supply and no flow of current passes via the switching elements (32–35) of the bridge circuit (28) from an intermediate circuit into the resonant circuit (27) but a flow of current is maintained in the resonant circuit (27).

12. Method as claimed in claim 1, characterised in that the flow of current in the drive phases is generated by activating the switching elements (32 and 35; 33 and 34) in pairs, whereas the switching elements (32 and 34; 33 and 35) are activated during the freewheeling phase.

13. Method as claimed in claim 1, characterised in that the control system (4) constantly assigns the control states (S1–S4) to the half periods of the resonance current prevailing at any time so that when the bridge circuit (28) has been synchronised with the correct timing, a switch is made back to normal operation.

14. Method as claimed in claim 1, characterised in that several comparators (81–84) are connected to the control system (4) and a logic unit (76) and the comparators (81–84) compare the actually prevailing current and voltage values, in particular the actual values, delivered by a measuring device (47 and/or 70) with corresponding stored desired values, a control being run by the control system (4), in particular a special control process, if the desired values are exceeded.

15. Method as claimed in claim 14, characterised in that the comparator (81) compares the resonance current "I res" supplied by the measuring device (47) with a pre-set maximum permissible desired current "I max" and a signal "I resmax" is output to the logic unit (76) via a line (85) if the desired current "I max" is exceeded.

16. Method as claimed in claim 15, characterised in that the control system (4) monitors to see whether, after several current zeros have occurred in the resonant circuit, the signals "I resmax" and/or "U max" have fallen below the desired value "I max" and/or "U max".

17. Method as claimed in claim 14, characterised in that the comparator (83) compares the welding voltage "U" of the measuring device (70) with a pre-set maximum permissible desired voltage "U max" and a signal is output to the logic unit (76) via a line (87) if this desired voltage "U max" is exceeded.

* * * * *